Feb. 21, 1967  F. OLLFISCH ETAL  3,304,834
METHOD AND APPARATUS FOR SEVERING GLASS PANELS
Filed Sept. 7, 1965  9 Sheets-Sheet 2

INVENTORS:
FERDINAND OLLFISCH
HEINZ REINMOLD
BY
Bauer and Seymour
ATTORNEYS

Feb. 21, 1967   F. OLLFISCH ETAL   3,304,834
METHOD AND APPARATUS FOR SEVERING GLASS PANELS
Filed Sept. 7, 1965   9 Sheets-Sheet 3

INVENTORS
Ferdinand Ollfisch &
Heinz Reinmold

BY *Bauersand Seymour*

ATTORNEYS

INVENTORS:
FERDINAND OLLFISCH
HEINZ REINMOLD
BY
Bauer and Seymour
ATTORNEYS

INVENTORS:
FERDINAND OLLFISCH
HEINZ REINMOLD
BY
Bauer and Seymour
ATTORNEYS

INVENTORS
Ferdinand Ollfisch &
Heinz Reinmold
ATTORNEYS 3,304,834
METHOD AND APPARATUS FOR SEVERING GLASS PANELS
Ferdinand Ollfisch and Heinz Reinmold, Merkstein, Germany, assignors to Compagnie de Saint-Gobain, Neuilly-sur-Seine, Seine, France
Filed Sept. 7, 1965, Ser. No. 485,522
Claims priority, application France, Dec. 14, 1961, 881,944, Patent No. 1,322,159
31 Claims. (Cl. 88—24)

This application is a continuation-in-part of our copending application Serial Number 243,450, filed December 10, 1962, now abandoned.

The present invention concerns a method and apparatus for marking large sheets or ribbons of material to indicate, identify or delineate thereon, lines along which the sheet is to be cut to reduce the same to a number of smaller pieces or panes of predetermined dimensions each. In the glass-making industry, the locating of lines along which a large sheet or ribbon of glass is to be cut, raises rather complex problems. Prior to the location or determination of such lines there are marked upon the sheet, as by colored chalk, paint, or adhesive strips, defects which must be eliminated in severing the sheet into smaller panels or sections. An operator, called an "estimator" notes these defective areas as the large sheet is positioned before him, and based upon his observations, formulates a cutting plan for the sheet which will at one and the same time, eliminate the aforesaid defective areas while establishing lines along which the remaining perfect areas must be cut into standard sizes of predetermined dimensions and/or into sizes to fill existing orders; and, of course, it is highly desirable that the defective areas be so delineated as to result in a minimum area of glass to be discarded. The cutting plan is generally formed by straight lines parallel with the vertical and horizontal edges of the large sheet and which outline the smaller panels or panes to be cut therefrom. Generally the whole lines delimiting the panels are not actually drawn. The estimator simply indicates by a mark upon the sheet or panel, the position of each line of severance. The glass sheet is cut along straight lines extending entirely across the sheet perpendicularly to the edges of the sheet. Thus it is sufficient to place a single mark upon the sheet through which each line of severance will pass, it being understood that the actual cutting lines will be subsequently drawn or scored perpendicularly to the edge of the sheet, each through a respective mark. The glass sheet is thus delimited into a first series of panels along either the width or the length of the sheet. A second series of marks are then positioned over and upon the sheet to indicate the positions of cutting lines perpendicular to the first series thus fully delimiting the panels to be severed. During further processing of the glass sheet, the sheet will be first severed into a series of panels along cutting lines through the first series of marks. Then each panel will be further cut along lines passing through the second series of marks. The estimator determines the position of the marks in such a way that the dimensions of the glass panels finally obtained will correspond to the orders on hand, and that the defects are included in portions of the glass between these panels, which portions are discarded as commercially unsatisfactory. The estimator endeavors to keep the amount of glass thus discarded to the lowest possible amount.

The work of the estimator is highly complex and complicated in prior art procedures because in order to note the defects marked upon the large sheet he must be close thereto while, in such position it is impossible for him to see the entire surface of the sheet. On the other hand, when he moves back away from the sheet so that he is able to see the entire area thereof he is unable to work directly upon the sheet to form thereon the required marks identifying lines of severance. As a result there is a considerable and unavoidable loss of time which delays production, increases the cost of cutting or severing, and frequently results in an imperfectly-conceived plan of cutting and an unnecessary waste of otherwise saleable glass.

It is the principal object of the present invention to provide a new and improved method of, and apparatus for the examination and marking of large sheets to establish or locate thereon, lines along which the sheet is to be cut to provide smaller panels of predetermined sizes, while eliminating with a minimum loss of saleable glass or material, defective spots or areas previously indicated or outlined thereon.

Another object is to provide a novel method and apparatus for examining and marking large sheets according to a plan formulated by the skilled estimator.

More particularly, it is the purpose to carry out the object set forth in the preceding paragraph, by optically projecting onto a screen before the estimator, an image reduced to scale, of the entire area of the large sheet to enable him at one and the same time, to note all defective areas or spots of the sheet which have been previously marked or indicated thereon. Means are provided, under control of the estimator at his position before the image screen, by which he may scribe or otherwise visibly indicate lines of severance upon the large sheet in accordance with the position of a ruler or straight edge moved over the screen in synchronism to the aforesaid reduced scale, with movements of the scriber or marking means over the large sheet.

Another object is to provide mechanism by which the lines of severance are indicated upon the large sheet by applying thereto semi-automatically, under control of the estimator, adhesive markers identifying lines of cutting or severance which will result in the most efficient utilization of the perfect areas of the sheet, while eliminating with minimum loss of glass the defective areas or spots thereof.

Still another object of the invention is to provide mechanism under control of the estimator, by which he may at times and as his work requires, arrest or stop translation of a large sheet as it passes before him.

Yet another object is to provide a method of observing defects indicated upon a large sheet, by affording the estimator a reduced-scale image of the entire sheet at a convenient location before him, together with scale means movable over the screen, and moving such scale means synchronously and to the aforesaid reduced scale, with marking means as it moves over and in operative relation with the large sheet.

Another object is to provide means by which the estimator is able to positively and accurately control movements or translations of the marking means over the large sheet, and to locate the same in desired positions thereover, from and by an observation of the corresponding reduced-scale movement and positioning of the ruler over and with respect to the image on the screen before him.

Another object is to provide an apparatus which presents to the estimator an image to a scale reduced from that of the sheet itself, wherein the defects indicated, marked or identified upon the actual sheet appear in conventional visible signs, markings or indicia and by which he may formulate a plan and/or record instructions concerning the subsequent severing and shunting operations. Such instructions may be used automatically but preferably manually in the production of panels of selected sizes, and which may be recorded in conventional signs or symbols either on the sheet itself or upon a memory device such as paper or magnetic tape.

Yet another object is to provide a telemetric and follow-up control system interconnecting the marking means and ruler means movable over and across the sheet and image screen respectively, whereby the two are moved in the aforesaid reduced-scale relation synchronously and with great accuracy.

Still another object is to provide means including a keyboard before the estimator whereby he can effect semi-automatically any selected distance or degree of movement of the marker and ruler over and with respect to the sheet and screen, respectively, and which acts automatically to stop both, when the selected distance or degree of movement has been effected with a high degree of accuracy.

Another object is to provide a method and apparatus which are an advance in the art of processing and handling large sheets of glass which are to be severed into smaller portions of predetermined size and geometrical form, and which enables large savings in time required per unit sheet, in costs per unit area of usable glass, and a material increase of salable glass from each sheet processed.

Other objects and advantages will be obvious to those skilled in the art, after a study of the following detailed description in connection with the accompanying drawing.

In the drawing:

FIGURE 1 is a view in vertical transverse section, showing the means for supporting and moving the large sheets horizontally in their own common plane, together with the estimator's cubicle and controls therein;

FIGURE 2 is a diagrammatic view showing a glass sheet being processed, the optical screen, the telemetric means interconnecting the marking means movable over the sheet, and the ruler movable over the screen, and the control and follow-up system by which the estimator may set and initiate any desired or selected distance of movement of the marker, and the marker automatically stopped when such movement has been completed to a high degree of accuracy;

Figure 3:
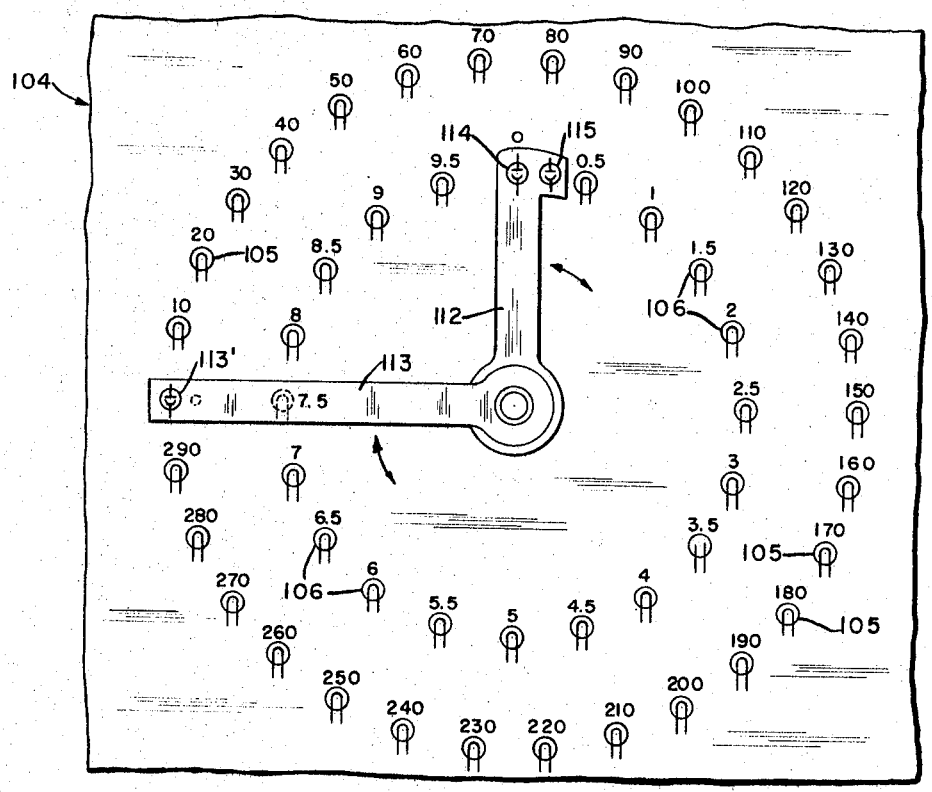
FIGURE 3 is a detail view to an enlarged scale, of the lamps which are illuminated in accordance with a desired length measurement, together with photoelectric cell means moved in timed relation with movement of the sheet of glass being processed, and energized to stop movement of the marker relatively to the sheet.
Figure 10:
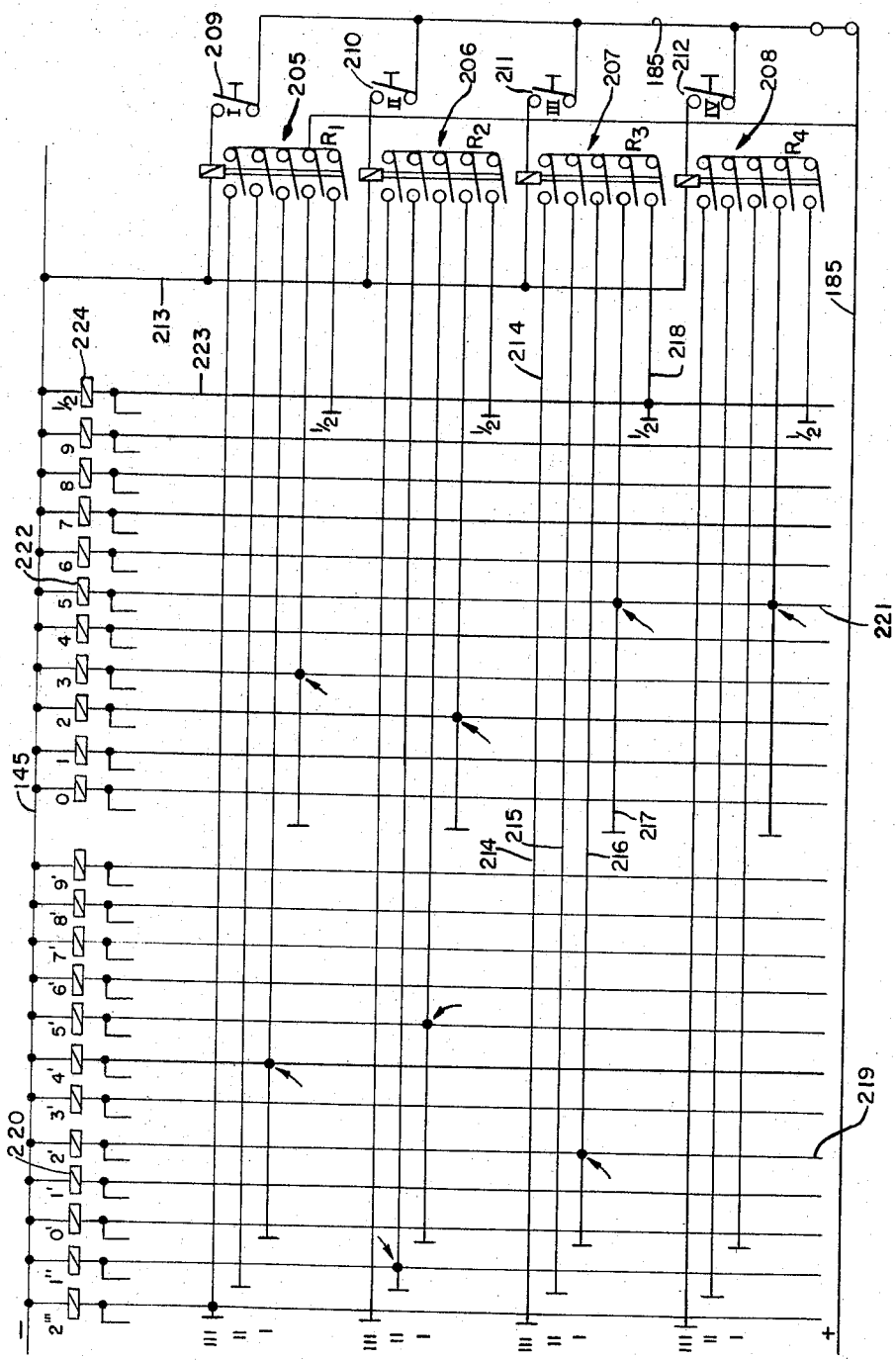
Figure 11:
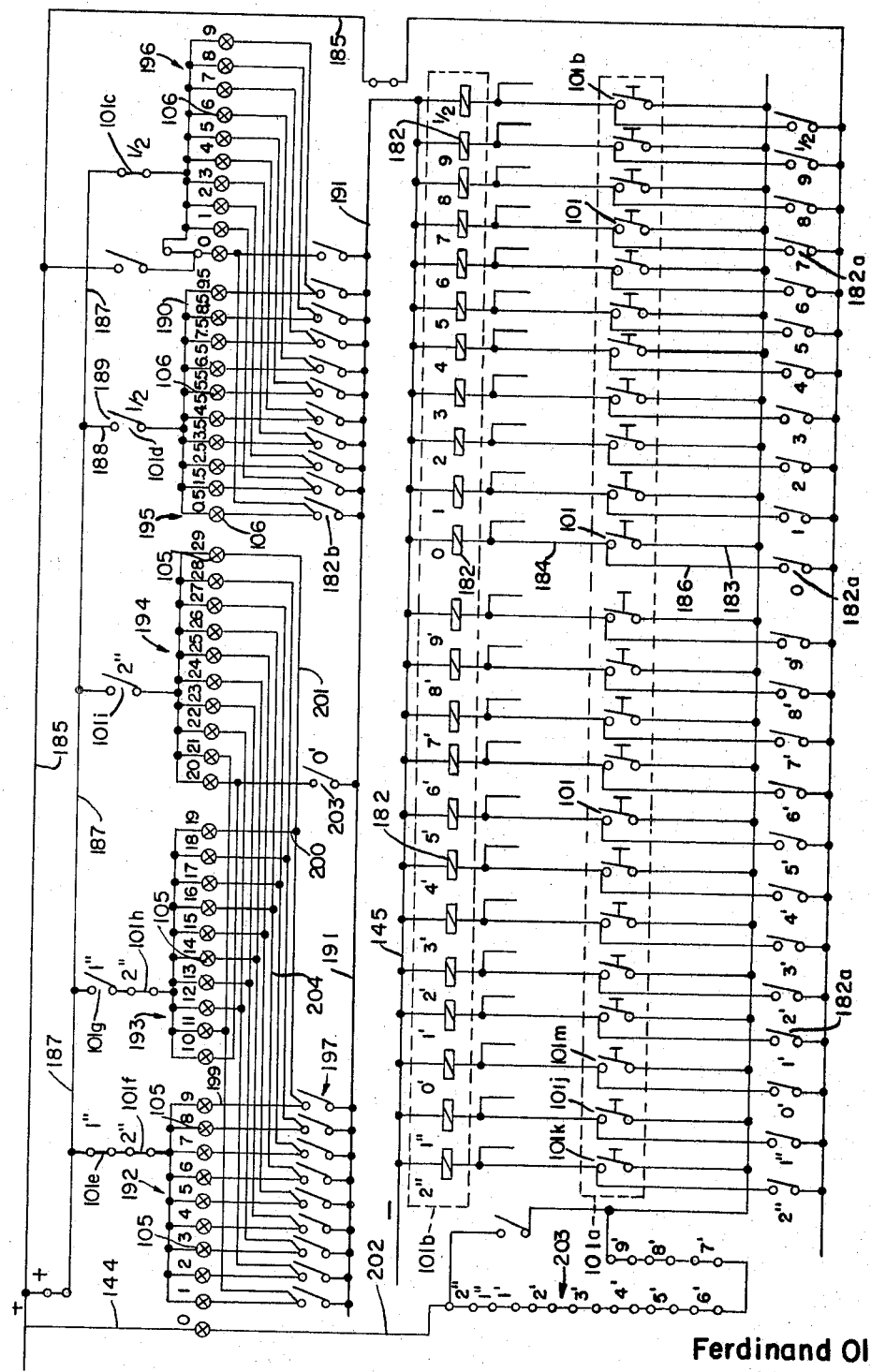

FIGURE 10 is a wiring diagram showing circuitry by which a plurality of lamps of the measuring instrument, may be illuminated in sequence to carry out a predetermined series of different length measurements; and FIGURE 11 is a detailed wiring diagram showing the hook-up by which the estimator controls the energization of lamps of the instrument of FIGURE 3, using a number of key-operated switches materially less than the number of lamps.

Figure 1:
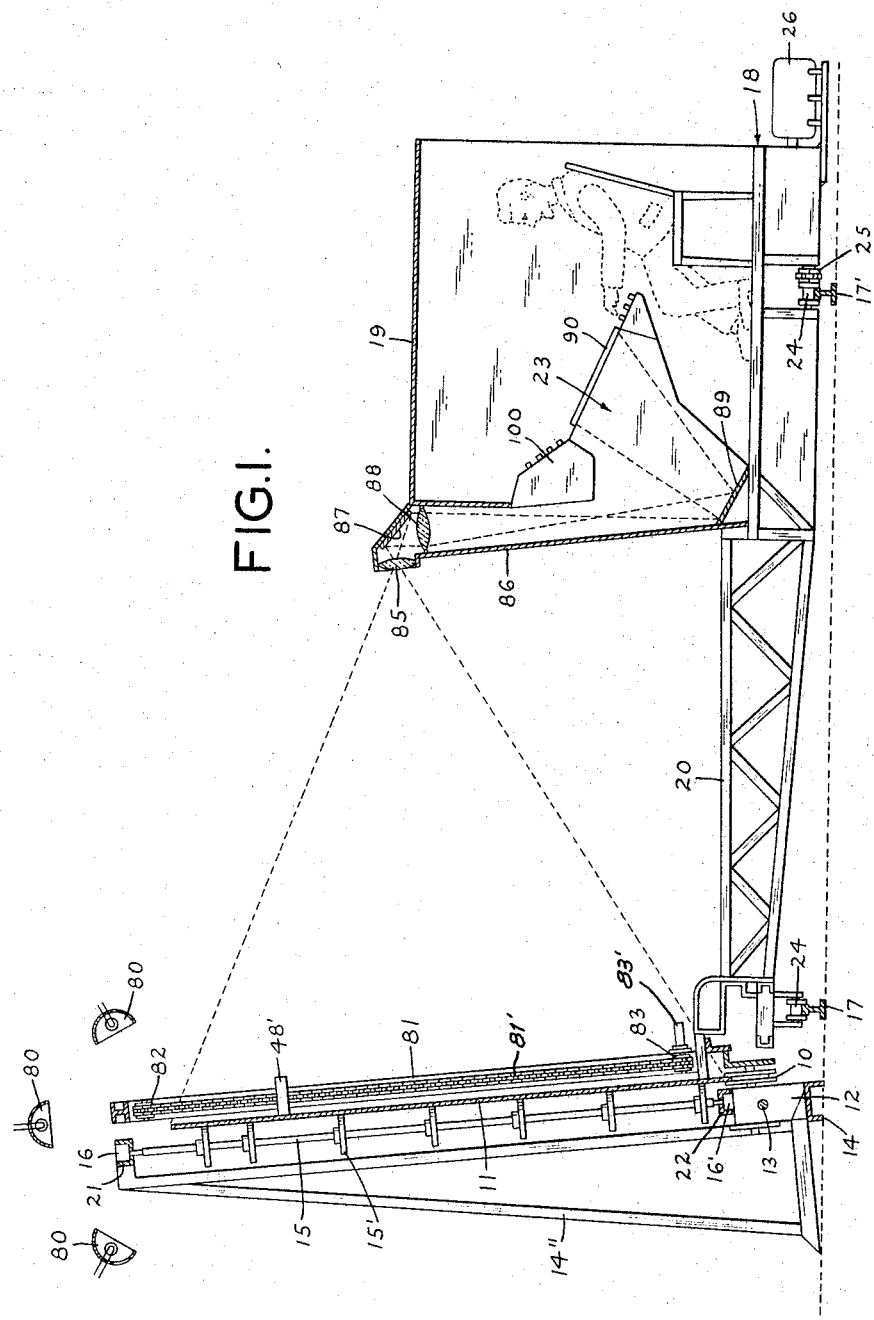

Referring more particularly to FIGURE 1, a frame for supporting the glass sheets comprises lower and upper horizontal beams 14 and 16, respectively, and which are interconnected in spaced parallel relation by a number of generally triangular brackets such as the one indicated at 14''. These brackets are spaced in horizontally aligned relation along the path of travel of the sheets one of which is shown at 11 in vertical section.

Figure 4:
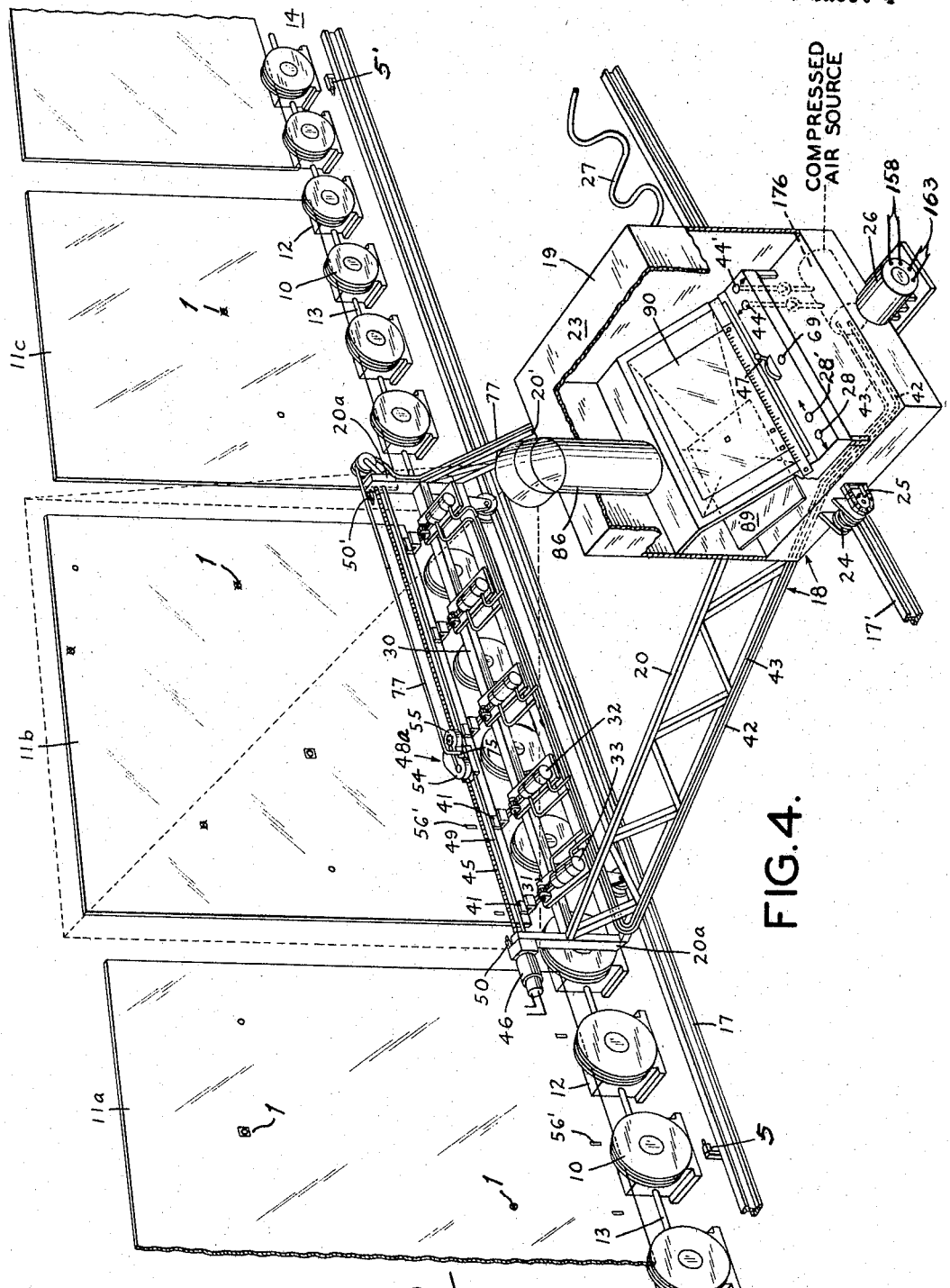
FIGURE 4 is a perspective view corresponding generally to the parts shown upon FIGURE 1, but incorporating a modified form of mechanism for translating the marker horizontally and, in addition, showing means for temporarily arresting translation of the glass sheet before the estimator, and in greater detail, the nature and arrangement of controls within the estimator's cubicle.

As best shown upon FIGURE 4 a plurality of gear boxes 12 are fixed on beam 14 in spaced relation therealong. Each of these boxes has a shaft 12', FIGURE 5, journaled in its forward side wall and a roller 10 having a grooved periphery is fixed to the external end of each shaft so that the tops of these rollers are horizontally aligned and conjointly support and guide the successive sheets 11a, 11b, 11c, etc., for horizontal translation in their common plane, as will be clear from inspection of FIGURE 4.

A shaft 13 passes horizontally in succession through each of the gear boxes 12 and, within each box is connected, as by bevel gearing not shown, with the shaft 12' thereof bearing its roller 10. Thus rotation of shaft 13 from a source of power, not shown, rotates all rollers 10 at the same peripheral speed and in operation translates all sheets 11a, 11b, 11c, etc., at the same linear velocity in their common plane. In FIGURE 4 the direction of translation is from right to left as indicated by arrow A.

Figure 5:
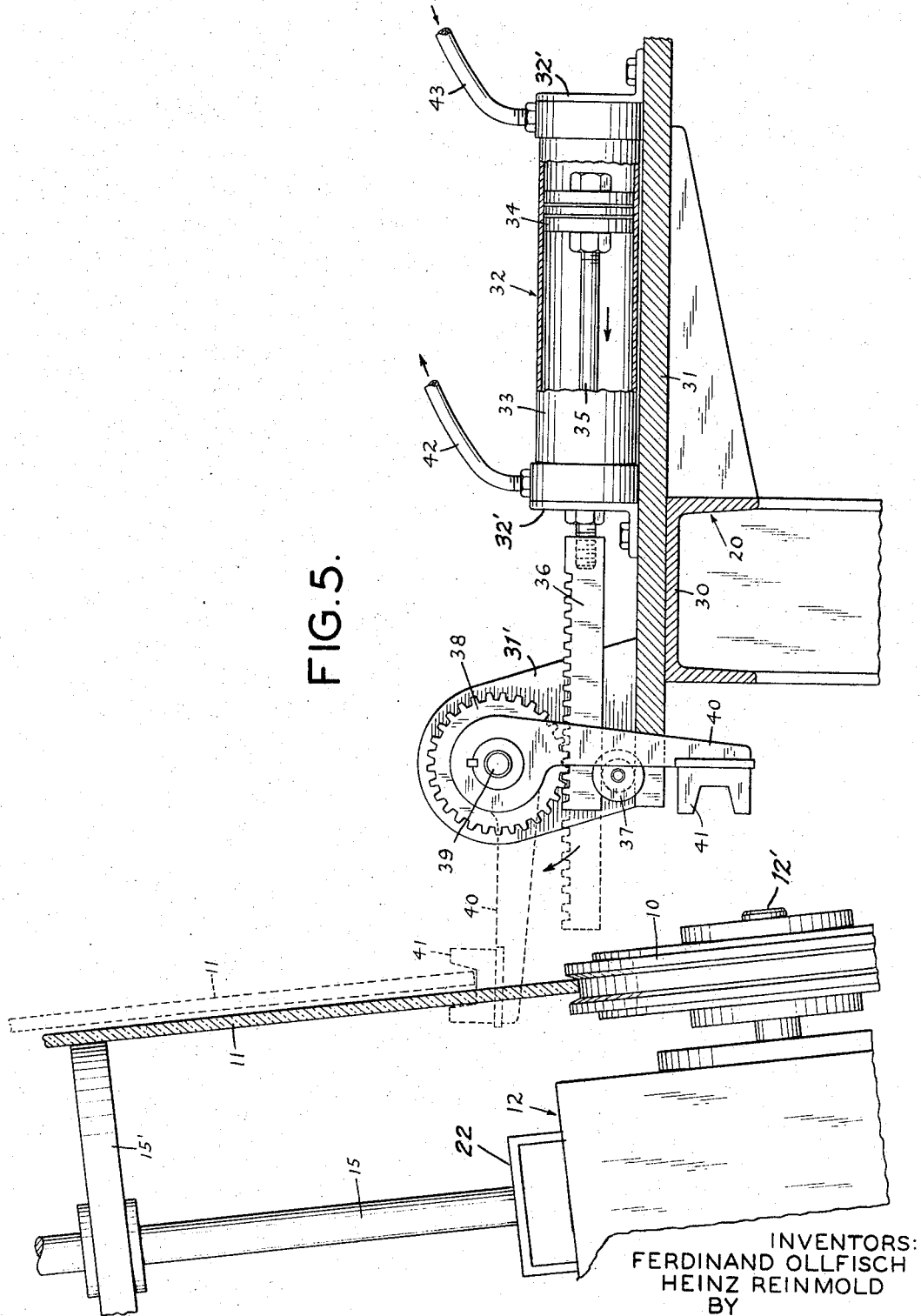
FIGURE 5 is a detail view to a greatly enlarged scale, and partly in section, of one of the plurality of duplicate units by which a sheet before the estimator may be elevated off its conveyor and its motion thereby temporarily arrested.

As is clear from FIGURE 1, a beam 22 is fixed to and extends horizontally along and over the top walls of gear boxes 12, parallel with beam 14. A plurality of shafts 15, FIGURES 1 and 5, are journaled at 16, 16' at their upper and lower ends in beams 21, 22 respectively. These shafts are spaced uniformly at regular intervals along the beams and each has a plurality of rollers 15' identical in size and fixed thereto in spaced relation therealong. Shafts 15 are all coplanar and inclined at a small angle with the vertical. The shafts 12' extending from gear boxes 12 are all normal to the plane of shafts 15 so that the sheets 11 as they pass along over and supported by rollers 10 and in contact with rollers 15', are stable and have no tendency to tip forwardly.

A pair of tracks 17, 17', FIGURES 1 and 4, are horizontal and horizontally spaced parallel with the direction of travel of sheets 11. There is mounted on these tracks, as by flanged rollers 24, an assembly including a cubicle 19 within which the estimator is seated, as shown in dotted lines, FIGURE 1, with various controls before him. These controls will be subsequently described in detail; but for the present it is sufficient to state that they are mounted upon a console or cabinet 23. A motor 26, FIGURES 1 and 4, is carried by the cubicle and drives, through a reduction gearing not shown, a chain 25 passing about a sprocket fixed with and rotatable as a unit with the adjacent roller 24, to thereby translate the assembly along tracks 17, 17'.

The aforesaid assembly also includes a pair of trusses 20, 20' which are fixed with the cubicle and which diverge horizontally forwardly toward the sheets. The outer ends of these trusses are rigidly interconnected by a horizontal beam 30. See FIGURES 4 and 5. Normally closed limit switches, FIGURE 4, are identified at 5, 5'. These are adjustably fixed to track 17 and are engaged by the assembly at its respective right and left limiting positions to thereby open the circuit of motor 26 and arrest further movement of the assembly in the corresponding direction.

A plurality of power-actuated sheet-lifting units are fixed in uniformly-spaced relation to and along beam 30, to extend over a dimension about equal to the horizontal or longitudinal dimension of the sheet of glass moving thereover. Five of these units are shown, but the number is not critical and may be varied to suit different installations.

The lifting units are all alike and, referring particularly to FIGURE 5, each consists of a base plate 31 horizontally fixed on beam 30 and to which is attached, as by brackets 32', a double-acting pneumatic or hydraulic power cylinder 32 having piston 34 and rod 35 therein. Rod 35 protrudes forwardly through a gland of cylinder 32 and has aligned therewith a rack 36 and adjustably attached to its end. Bracket means 31' fixed to plate 31 journals a shaft 39 to which is fixed a gear 38. Rack 36 is held in mesh with gear 38, by a grooved roller 37 journaled upon bracket 31'. A radial arm 40 is keyed to shaft 39 adjacent gear 38 and has a channeled glass support 41 of resilient material, fixed to its distal end.

The arrangement and positioning of the lifter units are such that on simultaneous introduction of pressure fluid into cylinders 32 through conduits 43, FIGURE 5, and release of pressure in conduits 42, pistons 34 are thrust forwardly, that is, to the left, and arms 40 are rotated clockwise from the full-line position shown, to the dotted line position. Just before arriving at the latter position grooved supports 41 engage the lower edge of sheet 11 and lift it from rollers 10. Retraction of pistons 34 and consequent lowering of the sheet onto the rollers is effected by the simultaneous introduction of pressure fluid into the cylinders, through conduits 42 and release of pressure in conduits 43. By valve means under control of the estimator in cubicle 19, pressure fluid is simultaneously introduced at 43 into all cylinders 32, so that all arms 40 rotate in unison and coact to positively elevate the sheet from contact with rollers 10. Likewise, pressure fluid is simultaneously introduced through all retraction conduits 42 to positively and gently lower the sheet onto the rollers. When so lifted the sheet is, of course, not affected by rotation of rollers 10 and under such conditions moves as a unit with the assembly of cubicle 19, trusses 20, 20', etc. Thus whenever he wishes to make a more detailed inspection of a particular sheet, the estimator is enabled to lift it from rollers 10 and to arrest its translation until he can complete inspection, marking, etc.

Figure 2:
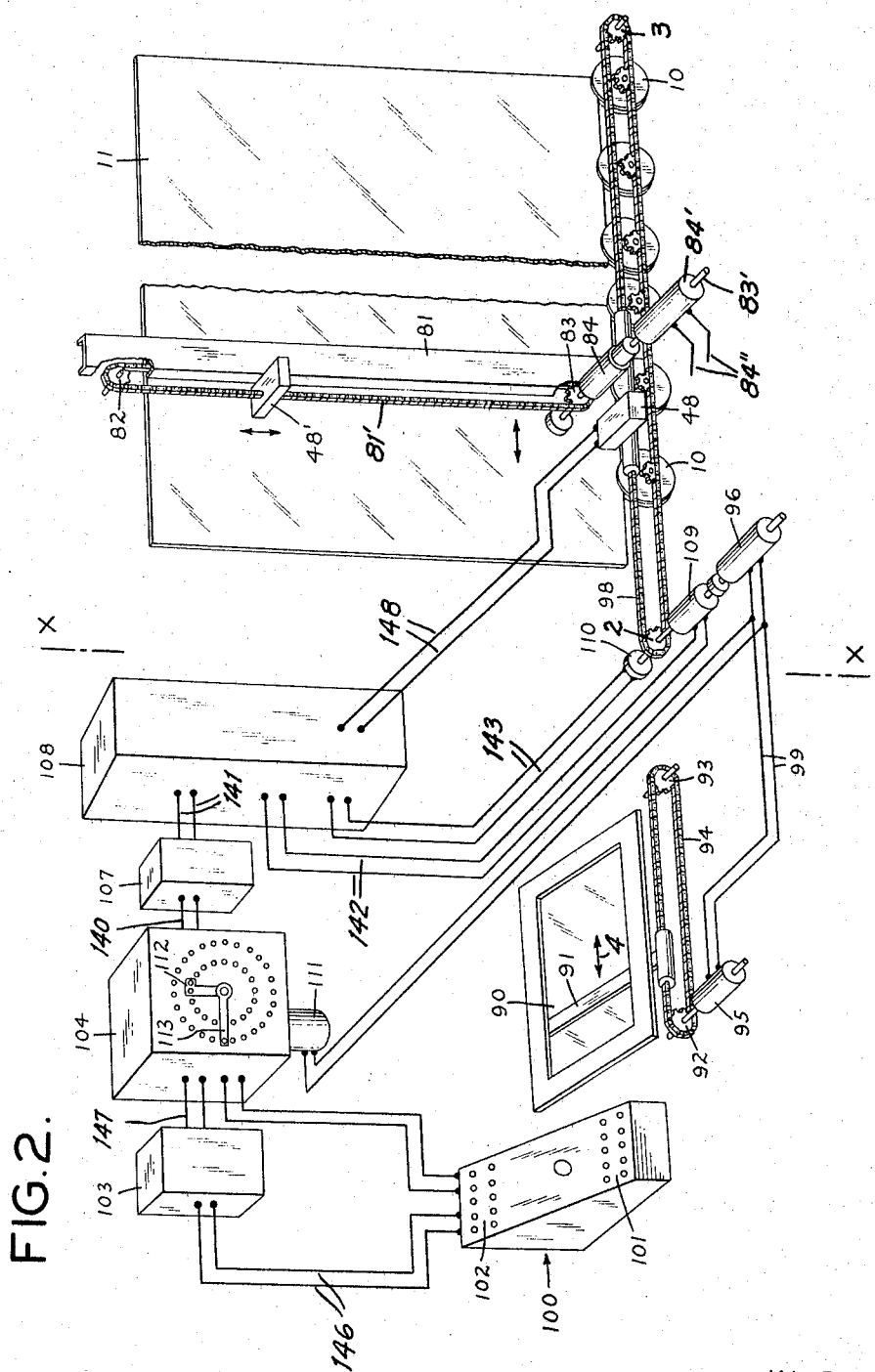

The console 23 before the estimator in cubicle 19 includes an optical screen 90, FIGURES 1, 2 and 4, and which may be of the frosted or ground glass type, for example. The sheet 11 being processed is illuminated by lamps 80, FIGURE 1, controlled from the console panel. The full image of the sheet is projected onto screen 90 by optical elements such as objective 85, mirror 87, condenser 88, and mirror 89 all fixedly mounted in casing 86. Optical equivalents such as prisms may be substituted for the mirrors shown. The principal fact is that the image of the sheet upon the screen is to a reduced scale wherein for any given image the reduction scale is the same in mutually-normal directions in the plane of the screen so that the image, while reduced in scale, gives an accurate undistorted picture of the sheet and the location of defects marked thereon. Referring to FIGURE 4 several such defects are indicated by spots or marks 1 on sheets 11a, 11b and 11c and which, of course, will appear in correct proportions and relative positions upon the image on screen 90 as each sheet is projected thereupon. Furthermore, it is contemplated that the image may be provided by a television camera positioned to scan an entire sheet such as 11b, and to project the image onto the screen of a television receiver. In such case, of course, the cubicle or station 19 with its controls subsequently described, may be at a fixed remote position with respect to the sheet. In such a modification the line of separation is indicated by X—X, FIGURE 2, and only the camera itself would be mounted at the position occupied by objective 85, FIGURE 1. However, the camera could be mounted for pivoting about a normally vertical axis or for limited translation in the horizontal direction parallel with the direction of movement of the sheets, in order to provide adequate time for the estimator to formulate his plan of cutting.

In the form of the invention shown upon FIGURE 2, the horizontally translated marker is schematically identified at 48. This marker will be subsequently described in detail in connection with FIGURES 4 and 6. Marker 48 is fixed to the upper horizontal pass of a chain or flexible strap 98 passing over and about sprockets 2 and 3 which, as will be understood, are journaled in horizontally-spaced relation on and for translation as a unit with the frame 20, 20' etc., carrying cubicle 19. The shaft to which sprocket 2 is fixed is connected by gear or other speed-reducing means, not shown, with the shaft of a reversible motor 109 so that, in a way clear from inspection of FIGURE 2, energization of the motor translates marker 48 horizontally over and with respect to sheet 11.

A ruler, straight-edge, or scaled guide 91 is mounted over screen 90 for guided translation in the direction normal to its length, as indicated by arrow 4, and is connected to the upper horizontal pass of a second endless chain, flexible strap or cable 94 passing over and about spaced sprockets or pulleys 92 and 93. Sprocket 92 is connected to rotate in synchronism with the shaft of a telemetric repeater motor 95. This repeater is connected over lines 99 with a telemetric transmitter 96 directly mechanically coupled to motor 109. The specific wiring hook-up will be later described in detail, but for the present it is sufficient to explain that the connections are such that for each increment of horizontal translation of marker 48 by motor 109, a corresponding increment of translation is imparted, to a predetermined reduced scale, to ruler 91 over screen 90. Thus, for every position of the marker over sheet 11, ruler 91 is located in the same position over and with respect to the image of the sheet projected upon screen 90 and the estimator, having precise control of motor 109, knows at once merely from inspection of the relative position of ruler 91 over and with respect to the image on screen 90, the corresponding true position of the marker 48 with respect to sheet 11.

The construction shown upon FIGURE 4, while retaining all of the functions and advantages by which marker 48 and ruler 91 are synchronously translated, embodies a somewhat different form of marker-translating mechanism. In this form, uprights 20a at the outer or distal ends of trusses 20, 20', journal the respective ends of a horizontal threaded rod 45. A reversible motor 46 corresponding in purpose and function to motor 109, FIGURE 2, has its shaft coupled with one end of the rod. As in the case of motor 109, motor 46 is under control of the estimator by means of a switch 47 in cubicle 19. Throwing the toggle of this switch to the right or to the left of its central upright "off" position energizes the motor and rotates rod 45 in a corresponding direction.

Figure 6:
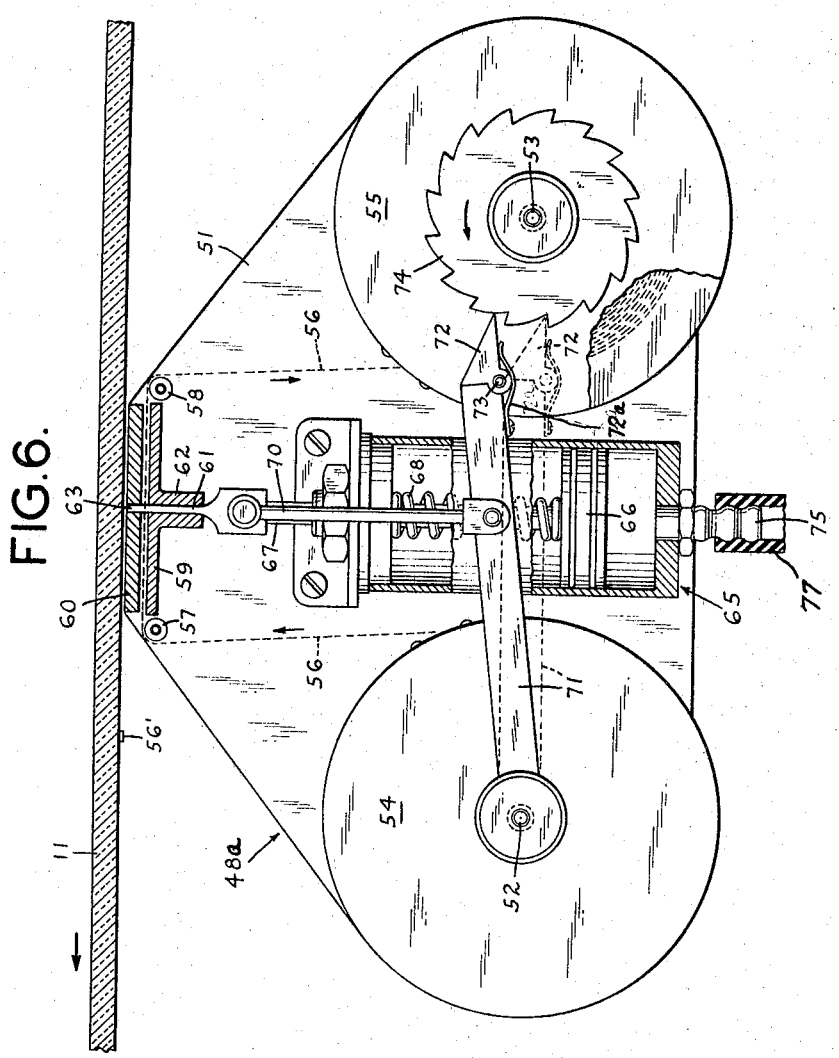
FIGURE 6 is a detail view partly in section and to an enlarged scale, of the mechanism under the control of the estimator, for applying to the glass sheet at appropriate selected locations thereon, adhesive markers which will be subsequently used to locate or identify lines along which the sheet is ultimately severed.
Figure 6A:
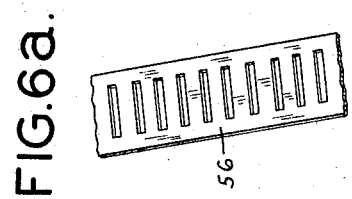
FIGURE 6a is a perspective view of a portion of a length of the adhesive tape used in the device shown upon FIGURE 6, after a number of markers have been punched therefrom and applied to the glass.

Marker 48a, FIGURE 4, carries a nut engaging rod 45 so that the marker is translated to the right or left over and relatively to the sheet, in accordance with the direction of throw of the toggle of switch 47. Referring more particularly to FIGURE 6, the marker includes a generally triangular plate 51 having bearing journaling two reels 54, 55, spaced in the direction of travel of the sheet of glass. A strip of adhesive tape 56, indicated in dotted lines, passes from reel 54 forwardly to and about guide rollers 57, 58 journaled on plate 51. The straight pass of the tape between rollers 57 and 58 lies parallel with and adjacent glass sheet 11, and passes over and across a guide plate 59 fixed with plate 51 and having an apertured boss 62 forming a guide for a punch 61. A punch plate 60 is fixed to plate 51 in closely-spaced parallel relation with guide plate 59, to lie contiguous to the glass sheet. The punch plate has an aperture in which the end 63 of punch 61 has a smooth shearing fit, so that when the punch is forced forwardly to the position shown upon FIGURE 6, a portion of tape 56 is first sheared out and then carried forwardly into contact with sheet 11 where it adheres in a position and location preselected by the estimator in cubicle 19. FIGURE 6a shows the appearance of a length of the tape after it has passed punch 61 so that a number of markers have been punched therefrom. After passing about guide roller 58 the used tape passes to and is wound on reel 55.

The means for reciprocating punch 61 in a working stroke is shown as a pneumatic or hydraulic cylinder 65 horizontally fixed to plate 51 and having a piston 66 therein. A rod 67 is connected at its respective ends with the piston and the punch so that, in an obvious way, the punch is projected in a working stroke to shear out and apply a marker to the glass whenever pressure fluid is introduced into cylinder 65 through conduit 75, under control of the estimator. A coil spring 68 surrounds rod 67 between piston 66 and the forward end of cylinder 65 and acts to retract the punch, rod and piston on release of pressure in conduit 75.

Means are provided to advance the tape one step for each reciprocation of the punch. The means shown for this purpose include a lever 71 pivoted at one end on an axis coincident with the axis of rotation of reel 54. Reel 55 has a ratchet wheel 74 fixed therewith. A pawl 72 is pivoted at 73 on the distal end of lever 71 and is urged into counterclockwise pivoting, to the limiting position shown upon FIGURE 6, by a leaf spring 72a secured at its left end to the side of the lever and its free end bearing upon the pawl. Lever 71 is actuated to effect the step-by-step rotation of reel 55, by a rod 70 connected at one end to the lever, between the ends thereof, and at its other or upper end as the parts are viewed upon FIGURE 6, to the punch.

Thus, as the lever is pivoted counterclockwise during a punching and marking operation, pawl 72 rides freely over the contiguous tooth of wheel 74 but, on retrograde movement of the punch and rod 70, under urge of spring 68, the pawl picks up the tooth and rotates reel 55 one step to draw tape 56 across and between plates 59, 60 by a distance equal to that between two consecutive apertures punched therefrom, as seen upon FIGURE 6a. Referring to FIGURE 4, a flexible hose 77 extends from cubicle 19 to the punch mechanism just described and as seen at FIGURE 6, has its end attached to connection 75 to cylinder 65. The hose leads along truss 20' to cubicle 19 where it is connected through a control valve with a source of compressed air identified by legend upon FIGURE 4. This source may also supply pressure fluid to cylinder 32 of the lift device previously described.

Still referring to FIGURE 4, translation of the entire assembly of cubicle 19, trusses or frame 20, 20', etc., on and along tracks 17, 17' is effected by a reversible motor 26 supported from cubicle 19 and driving, through a connection not shown, a chain 25. This chain passes about a sprocket fixed on a common shaft with one of the flanged rollers 24 mounting the cubicle assembly on track 17'. Motor 26 is supplied with current over a flexible cable 27 connected to a source of current by way of switches 28 or 28', on the estimator's console. Pressing button 28' effects energization of the motor to translate the cubicle assembly to the right, over and along tracks 17, 17', while when button 28 is pressed, motor 26 is energized to effect translation of the cubicle and marker assembly to the left.

Although the invention is highly useful with only a horizontally movable marker 48 as depicted upon FIGURES 4 and 6, a vertically-movable marker 48' may also be provided to add utility and versatility. Referring to FIGURES 1 and 2, a vertical post or standard 81 is carried by the truss assembly and is connected with marker 48 so that the two move as a unit in horizontal translation. The post is hollow and has a sprocket 83 journaled thereon at its lower end, and a second sprocket 82 at its upper end. An endless strap or chain 81' passes over and about these sprockets. One vertical pass extends within and along the post and the other is externally parallel therewith. This latter pass has vertical marker 48' affixed thereto. The marker is connected by means not shown, for guided vertical movement on and along the post so that on rotation of sprocket 83 the marker is moved vertically. Marker 48' may be a duplicate of 48, previously described in connection with FIGURE 6.

Shaft 83', FIGURE 2, to which sprocket 83 is fixed and by which it is journaled for rotation on post 81, is connected with the shaft of a reversible motor 84. This motor is, by appropriate electrical connections, under control of the estimator in cubicle 19. A telemetric transmitter 84' also has its shaft connected with the shaft of motor 84 so that sprocket 83 and the armatures of motor 84 and transmitter 84' rotate in timed relation. Although sprocket 83 and the armatures of motor 84 and transmitter 84' are shown as connected in 1:1 relation, it will be understood that a reduction gearing not shown, may be interposed between the shaft of motor 84 and sprocket 83 so that the shaft will make a number of rotations for each rotation of the sprocket.

An indicator or slide, not shown, may be mounted upon ruler 91 which, as previously described, translates over screen 90 in cubicle 19. The slide will be mounted for guided translation on and along the ruler, under the control of a repeater motor, likewise not shown. Electrical telemetric follow-up connections 84'', FIGURE 2 extend from transmitter 84' to the aforesaid repeater motor. The connections will be such that as marker 48' is moved vertically on and along post 81 in response to energization of motor 84, the slide on ruler 91 will be correspondingly moved to the aforesaid reduced scale. Thus marker 48' may be moved to any point over sheet 11 and for every such position the slide on ruler 91 will be correspondingly accurately located over screen 90 and to the predetermined reduced scale.

The work of the estimator is facilitated by a control keyboard identified generally at 100. See FIGURES 2 and 11. From FIGURE 1 it is noted that the keyboard is located in cubicle 19 at a convenient position before the estimator. The keyboard as shown has a lower and an upper bank of keys 101, 102, respectively. The keys of bank 101 effect the energization of outer and inner circular rows or crowns of equiangularly-spaced lamps 105, 106, FIGURE 3, of a measuring instrument generally identified at 104, FIGURES 2, 3 and 11. In the model shown there are thirty lamps 105 in the outer row and twenty lamps 106 in the inner row. Lamps 105 forming the outer row are numbered from zero to 290 in steps of ten units. Lamps 106 forming the inner row are numbered in half units beginning with zero and in sequence, 0.5, 1.0, 1.5, etc., through 9.5. Thus assuming that the units are in millimeters, if the estimator desires to effect a horizontal translation of the marker 48, of 1685 mm., he will press the appropriate key of keyboard 100, to effect illumination of that lamp 105 of the outer row corresponding to the dimensional number 160, and that lamp 106 of the inner row corresponding to dimensional number 8.5. Thereby he sets into the measuring instrument parameters which will result in a translation of the marker 48, of precisely 1685 mm.

A "tens" arm 113 and a "units" arm 112 are pivoted at the common center of the circular rows of lamps. Arm 113 carries at its distal end, a photoelectric cell 113' which, in rotation of the arm, passes over lamps 105 in sequence. Arm 112 carries a pair of photoelectric cells 114 and 115 at its distal end and so disposed that both travel in sequence over lamps 106 as arm 112 is rotated. Arms 112 and 113 are interconnected by gearing, not shown, so that arm 112 makes a full 360° rotation for each 12° of angular movement of arm 113. That is, arm 112 moves over twenty lamps 106 while arm 113 is moving from a position over one lamp to a position over the next adjacent lamp. Thus, as indicated on FIGURE 3, and as previously described, angular movement of arm 112 from one lamp to the next adjacent lamp, corresponds to a half unit based upon the ten units of spacing represented by the spacing between contiguous lamps 105 of the outer row.

Figure 8:
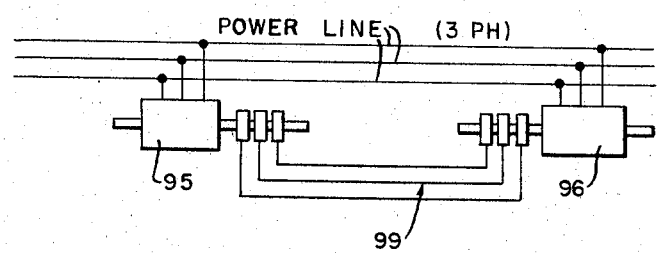
FIGURE 8 is a wiring diagram showing the electrical interconnections between one of the telemetric transmitters and its repeater, by which the marker and ruler, over the sheet and screen, respectively, are moved synchronously.
Figure 9:
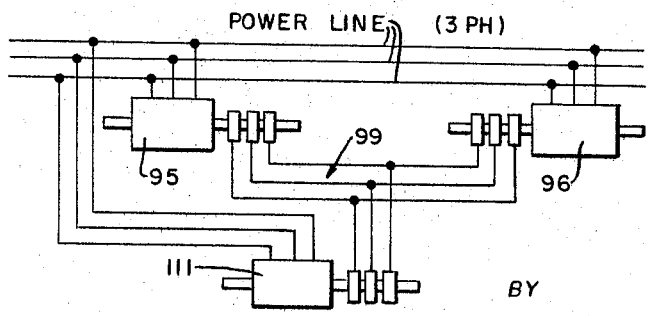
FIGURE 9 is a wiring diagram similar to FIGURE 8, but showing the interconnections in the system, of a second or follow-up repeater.

Arms 112, 113 are rotated by a repeater motor 111, FIGURES 2 and 9, which, as noted from FIGURE 2, is electrically connected from line 99 in parallel with repeater 95, to be rotated by and from transmitter 96, in synchronism with repeater motor 95 driving ruler 91 over screen 90. FIGURES 8 and 9 depict conventional interconnections between the power line and transmitter 96 and its repeaters. Connections 99 are schematic only and would ordinarily be three-phase.

By a special circuitry subsequently described in detail in connection with FIGURE 11, only twenty-three keys in the lower bank control the energization of fifty lamps in measuring instrument 104. These keys will be appropriately identified for the convenience of the estimator; and from the foregoing explanation it is clear that in the model shown, the estimator may set into the instrument any distance, in the case of millimeters, from five mm. as when "point five" lamp 106 only is illuminated, up to 2995 mm., in steps of 5 mm.

FIGURE 11 is a wiring diagram showing the circuitry by which semi-automatic control is effected when the estimator, in pressing selected switch keys of keyboard 101, causes illumination of certain ones of the lamps of banks 105 and 106, and thus causes the invention to measure and mark automatically the length established and determined by the particular key or keys pressed. Such a situation will arise, for example, when the estimator notes from the image thereof on screen 90, that a sheet coming up for processing is substantially perfect so that it can be processed and severed without consideration of the elimination of defective areas.

On FIGURE 11 the keyboard is identified by a plurality of identical switches 101, for convenience located in a straight line and enclosed within a dotted line rectangle 101a. Just above rectangle 101a there is a second dotted line rectangle 101b enclosing a plurality of relays 182, one for each key. Also for convenience and simplicity of illustration, normally-open switches, each embodied in a respective one of relays 182, are located in a straight line at the extreme lower portion of the figure, and are identified generally by 182a.

The bank of thirty lamps 105 of the outer circular row, as depicted upon FIGURE 3, is shown at the top left portion of the figure, the lamps being arranged in a line. Likewise, the twenty lamps 106 of the inner circular row, are indicated at the upper right of the figure and are also arranged linearly. While it is possible, of course, to provide a key and relay for each lamp, we prefer, as will be subsequently described, to divide the lamps into groups, and to provide circuitry by which, under a certain condition, a single key will energize one lamp only, and under a different condition will energize a different lamp only. First, however, it will be desirable to describe the circuitry of the keyboard for one lamp.

When any one of keys 101 is pressed, such as the one labeled zero or "0", FIGURE 11, a circuit is closed traced from the plus side of the line 144, lead 183, key switch 101, lead 184, the solenoid of relay 182, to the negative side of the line 145. Completion of the circuit as aforesaid, closes the corresponding relay switch 182a and establishes a holding circuit traced from the positive side of the line, lead 185, switch 182a, leads 186 and 184 to line 145. Thus, momentary pressing of any selected key is sufficient. The relay 182 also has a normally-open auxiliary contact indicated at 182b, which is closed in response to energization of its solenoid. When contact is made by switch 182b, a circuit is completed which extends from the positive side of the line, leads 187, 188, the switch 189 of a presently-energized relay, as subsequently described, lead 190, "0" or zero lamp 106, corresponding relay switch 182b, and lead 191 to line 145.

If there were one key and corresponding relay for each lamp, a total of fifty keys and relays would be required. To simplify the keyboard, decrease the number of required keys, and other wise simplify the circuitry and reduce the cost of construction and assembly, the lamps are divided into five groups of ten lamps each. Thus, one group includes lamps 105 including the ten-unit interval "0" to "9," inclusive, as identified upon FIGURE 11 and also upon FIGURE 3. The lamps of this group are identified generally at 192. Similarly the ten lamps of the ten-unit interval group are identified generally at 193. Group 194 includes the lamps of the ten-unit intervals 20 through 29. Group 195 includes the unit-interval lamps 0.5, 1.5, 2.5, 3.5, etc., through 9.5, while group 196 includes unit interval lamps 0, 1, 2, etc., through 9.

As clearly shown upon the figure, each group is separately connected with the positive side of the line 144, over lead 187. Thus the lamps of group 192 are adapted to be connected in parallel between leads 187 and 191, by way of two relay contacts 101e and 101f, connected in series. Likewise the lamps of group 193 are adapted to be connected in parallel between the same pair of leads, by a second pair of relay contacts 101g and 101h, in series. The lamps of groups 194, 195 and 196 are connected between the aforesaid leads by a respective one of three single relay contacts identified at 101i, 101d, and 101c.

By the aforesaid arrangement the number of keys may be reduced to twenty-three. Taking up first the lamps of inner row 106, a key 101b at the extreme right of the rectangle 101a, when pressed, energizes its relay solenoid, as previously explained, and establishes the usual holding circuit. At the same time it operates two auxiliary contacts 101c, normally closed, and 101d, normally open. Thus when key 101b is not pressed, actuation of any one of the keys of the ten at the right of FIGURE 11, next succeeding key 101b, and counting right to left, energizes a corresponding lamp of group 196. On the other hand, when selector key 101b is pressed, relay contacts 101c are opened and those of 101d are closed, so that the same group of keys now control energization of respective ones of the lamps of group 195. In the case of the thirty lamps 105 constituting groups 192, 193 and 194, and taking up first group 192, the two series connected relay contacts 101e and 101f are both normally closed. Hence whenever any one of the corresponding keys of keyboard 101 is pressed, it acts to energize a lamp of group 192. This is because of the two relay contacts 101g and 101h, in series, 101g is normally open, while 101h is normally closed. Similarly the single relay contact 101i connecting the lamps of group 194 between leads 187 and 191, is normally open.

When the estimator desires to energize a lamp of group 193 he presses key 101j, second from the left of the row of keys depicted upon FIGURE 11. Thereby, in addition to the usual holding circuit, he (a) opens relay contact 101e and (b) closes normally open relay contact 101g. Since relay contact 101h is normally closed, the same set of keys is now available to energize any selected lamp of group 193, and have no effect upon either the lamps of group 192 or 194. Finally, when leftwardmost key 101k is pressed, in addition to establishing a holding circuit, the contacts 101f and 101h are opened and those of 101i are closed, thus transferring to the same set of keys, control of the lamps of group 194. The solenoid of the relay such as 182, controlled by each respective key, also closes a respective one of a plurality of contacts comprising a first group of nine at the left center of FIGURE 11, and identified generally at 197, and a second group of ten at the right center of the figure and one of which, 182b has been described.

Three leads extend from one terminal of each of the relay contacts 197 to respective lamps of the groups 192, 193 and 194. Thus, for example, referring to the contact 197 at the right end of the group, leads 199, 200 and 201 extend respectively to the rightwardmost lamp of each of the three groups just identified. Since the zero or "0" lamp 105, shown at the extreme left of the row, is used only when a short measurement is being made by one of lamps 106 alone, such for example as 05.5 cm., the circuit of this lamp extends from the positive side of the line 144, zero lamp 105, lead 202, and a chain of normally-closed relay contacts generally identified at 203, at the lower left of the figure. Each relay contact of this group is opened by energization of a respective one of the keys controlling lamp groups 192, 193 and 194. Hence whenever a measurement is to be made which will include one of the lamps 105, the circuit through zero lamp 105 is opened and measurement is effected by rotational movement of arm 113 from its zero position shown, to a position over the energized one of lamps 105. Since there are but nine relays in group 197, a tenth relay switch 203 is provided leading directly to the first lamps at the left, of groups 193 and 194, and is closed by the relay of key switch 101m when pressed.

In the illustration previously given, it was assumed that the parameters were adjusted for measurement in millimeters and that the estimator desired to move the marker through a distance of 1685 mm. The manner in which this would be done is explained. Since the first two digits of the number require illumination of the correspondingly identified lamp of group 193, the estimator first presses key 101j, thus opening contact 101e and closing contact 101g. Next he presses the "6" key 101, the same being shown as the ninth from the right of the figure, to thereby close the relay contact of group 197, shown as the sixth from the left in the figure. This establishes a circuit by way of lead 187, relay contacts 101g, 101h, the desired "16" lamp of group 193, lead 204, the aforesaid contact of relay group 197, and lead 191 to the negative side of the line at 145.

Next he presses key 101b thus establishing the usual holding circuit, opening relay contact 101c and closing contact 101d, thus transferring control to the lamps of group 195. Then he presses the "eight" key, shown as third from the right of the figure. This acts to establish a holding circuit and to close the corresponding "eight point five" relay contact of the group including 182b, previously described. Assuming that measurement is to be made from left to right, FIGURES 2 and 4, the estimator shifts the toggle of switch 47 to the right, thus energizing motor 109 in the corresponding direction of rotation. The marker begins its travel to the right, FIGURE 2, and correspondingly drives transmitter 96 to actuate repeaters 111 and 95. Operation of repeater 111 rotates interconnected arms 112, 113. Simultaneously, repeater 95 shifts ruler 91 over screen 90. The "zero" lamp of group 192 is presently energized in the manner previously explained. Also as previously explained, passing of cells 114, 115 over presently illuminated "eight point five" lamp 106, is without effect upon the external circuit to motor 109, until arm 113 moves its cell 113' over the illuminated "16" lamp 105. Energization of cell 113' closes a relay circuit such that on the next pass of cells 114, 115 over the illuminated lamp 106, the circuit to brake 110 over leads 143 is closed to slow the motor and, finally, to open the motor circuit of leads 142. If automatic operation of marker 48 is provided, a signal is applied thereto over leads 148, as soon as motor 109 stops. The entire operation, although lengthy to describe, requires only a few seconds from the time the first key is pressed until marker 48 arrives at the exact desired position and applies a mark to the sheet of glass. The operation may also automatically de-energize the lamps 105, 106, previously energized, and restore arms 112, 113 to their respective zero or starting positions.

At times it is desirable to mark the sheets in accordance with a predetermined program or sequence of measured distances. Such a situation may arise where an article is being manufactured on a production line basis and, for example, four sheets of glass of dimensions 243, 152, 25.5 and 5 units are required in the order given for incorporation into the article. FIGURE 10 shows circuitry by which such a program may be established, it being understood, of course, that the number of dimensions in any cycle of the program, and the numerical values of each dimension, may be varied within very wide limits.

In FIGURE 10, the relays arranged in a horizontal row at the top of the figure may be the same as those enclosed within rectangle 101b of FIGURE 11, and, of course, controllable when desired in the manner previously described, manually or semi-automatically. At the right of the figure are shown a plurality of relays, in this instance four, identified generally at 205, 206, 207 and 208. Each relay includes five discrete contacts which are closed when its solenoid is energized. In this regard it should be remembered that the maximum number of keys 101 required to be pressed to set into the instrument any dimensional value within the limits thereof, is five. The circuit to the solenoid of each relay is under control of a respective one of four keys 209, 210, 211, and 212. When, for example, key 211 is pressed, the solenoid of relay 207 is energized by way of leads 145, 213, solenoid of relay 207, key 211, and lead 185 to the other side of the line. Thereby all five contacts of this relay are closed to respective ones of five leads 214 through 218. In accordance with the predetermined program, each of these leads is connected in the circuit of a selected one of the solenoids of the relays shown at the top of the figure. In the example selected for illustration, the first dimension to be measured by marker 48, is 243 units of length, which may be millimeters, inches, or any other preselected units depending upon the parameters of the instrument, that is, the distance the marker travels for each pass of cell 114 over two successive lamps 106. Hence, where the third dimension of the program is 25.5 units of length, leads 214 and 215 will be left unconnected, lead 216 will be connected with lead 219 of key solenoid 220, lead 217 will be connected with lead 221 of solenoid 222, and lead 218 with lead 223 from solenoid 224. In a similar way, clearly shown upon the figure, the horizontal leads from the contacts of relay 205 are connected with leads from the key solenoids, to select lamps which when energized, will set the dimensional digits 243 into the instrument 104; the leads from the contacts of relay 206 are connected to set the dimensional digits 152, and those of relay 208, the digit 5.

Thus when keys 209, 210, 211 and 212 are closed in sequence, each after completion of the previous movement of the marker, the parameters of the next dimension of the program may be set. This may be done by the estimator operating keys 209 through 212 in sequence each after completion of the previous measurement, or it may be done automatically under his control. Thus for example, a commutator device of instrument 100 may first close contact at 209. After the distance of 243 units has been measured in the example given, return of arms 112, 113 to zero or initial positions will cause movement of the commutator by one step to open contact 209 and close 210, thus illuminating lamps 105, 106 which will measure 152 units, and so on throughout the cycle. The cycles may be repeated indefinitely under control of the estimator.

Referring especially to FIGURE 2, the photoelectric cells carried by arms 112, 113 are electrically connected by leads 140, with the input of amplifier 107. The output of the amplifier is connected by leads 141 with a relay complex 108. Leads 142 extend from the relay to motor 109. The shaft of this motor has an electro-magnetic brake 110 connected therewith, and leads 143 extend from the relay to this brake. It has been previously noted that arm 112 of instrument 104 carries two photoelectric cells 114, 115, which pass in sequence over each lamp 106. When, for an assumed clockwise rotation of arm 112, FIGURE 3, cell 115 is first energized by passing over a presently-illuminated lamp, relay 108 is energized to effect a slowing of motor 109 as by cutting a resistance into the circuit including leads 142. When, almost immediately after, cell 114 is energized, the relay is again operated to close the circuit including leads 143 and thus energize brake 110 to bring the motor to a quick stop. As an alternative, brake 110 may be spring-urged to braking position and electromagnetically released by closure of the circuit including leads 143. In such a construction and arrangement, energization of cell 114 will act to open, rather than to close the circuit of leads 143. The precise functions are immaterial so long as the motor is first slowed and immediately thereafter braked to a complete stop with cell 114, for example, precisely over the illuminated lamp.

The aforesaid action effects stoppage of marker 48 and/or 48' with a high degree of accuracy. Assuming that the distance between successive lamps 106 corresponds to a translation of marker 48, etc., of five millimeters, and the diameter of the circular row of lamps is 30 cm., the actual distance between two consecutive lamps will be about 50 mm. Assuming the effective diameter of the lamps to be about 2 mm., marker 48 will be located with a possible error of about ±0.4 mm. This precision remains constant for all settings of the instrument and is of great advantage when a high degree of accuracy in severance of the sheets is required. Of course, the marker can be manually stopped by the estimator, by observation of ruler 91, without aid of instrument 104, when a lesser degree of accuracy is satisfactory.

Figure 7:
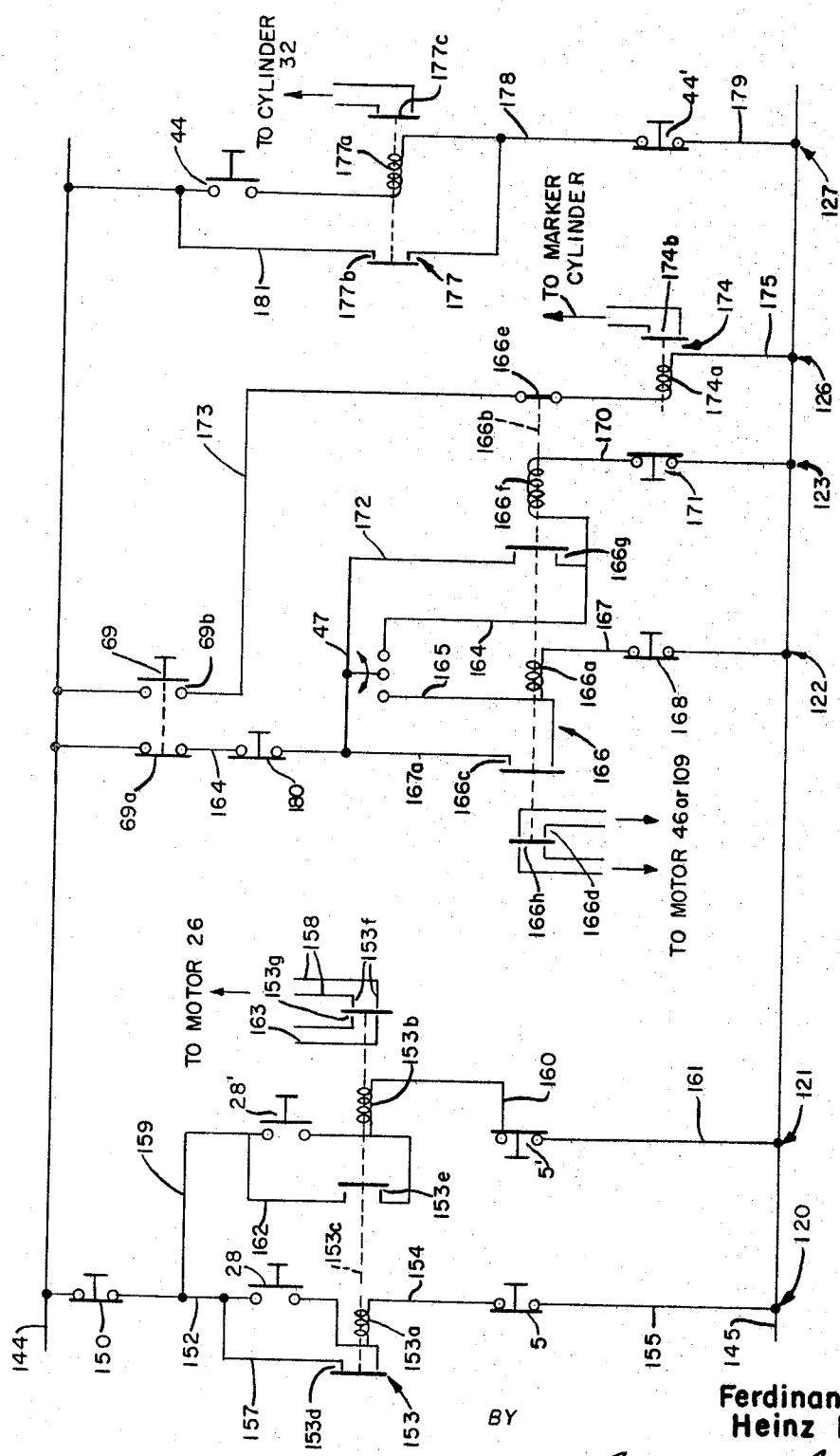
FIGURE 7 is a wiring diagram showing the electrical interconnections of the controls in the estimator's cubicle, for reversibly moving the cubicle assembly, moving the marker, operating the marker to apply a mark to the sheet, and elevating the glass sheet from its conveyor to temporarily arrest travel thereof.

FIGURE 7 is a circuit diagram of controls before the estimator and by which he may control the direction and extent of translation of the cubicle assembly 19, 20, etc., on and along tracks 17, 17', the direction and extent of horizontal movement of marker assembly 48 along and with respect to the cubicle assembly, parallel with the sheet of glass being processed, the energization of marking means 48 to apply a section of tape or other mark at a selected point on the sheet, and the energization of the means to raise the sheet from rollers 10 and temporarily arrest its motion therewith.

Referring first to circuits generally identified at 120, 121, these control the energization and respective directions of rotation of motor 26, previously described as being carried by the cubicle assembly and connected to translate the assembly along tracks 17, 17'. At 150 there is identified a normally-closed manual switch which is opened whenever the estimator wishes to de-energize motor 26 and stop the assembly in a desired position of translation. From one side of the line 144, circuit 120 passes through switch 150, lead 152, to switch 28 which also appears upon FIGURE 4, thence through solenoid 153a of relay 153, lead 154, limit switch 5, also appearing upon FIGURE 4, and lead 155 to the other side of the line 145.

Relay 153 is a double-pole, double throw instrument having, in addition to solenoid 153a, a second solenoid 153b and an armature 153c common to both solenoids. When solenoid 153a is energized as aforesaid, armature 153c is drawn to the right as viewed in the figure, and closes contacts 153d thereby establishing a holding circuit for the solenoid, by way of lead 157, contacts 153d, solenoid 153a, lead 154, etc. At the same time relay contacts 153e are held open. Simultaneously with movement of armature 153c to the right, its contacts 153f are closed to energize motor 26 over leads 158, and thus effect rotation thereof and corresponding translation of the cubicle assembly to the left as viewed upon FIGURE 4. When the estimator desires to arrest movement of the cubicle he presses button 150, thus opening the circuit of whichever solenoid was energized.

When he desires to move to the right, the estimator presses the button of switch 28', thus completing a circuit from line 144 through switch 150, lead 159, switch 28', solenoid 153b, lead 160, limit switch 5', also appearing upon FIGURE 4, and lead 161 to the other line at 145. Energization of solenoid 153b shifts armature 153c to the left as viewed upon the figure, thus closing contacts 153e to establish a holding circuit over leads 159 and 162, contacts 153e, solenoid 153b, lead 160, etc. At the same time, relay contacts 153d are held open, and contacts 153g are closed, thus completing a circuit to motor 26 over lines 163, and causing it to rotate in a direction translating the cubicle assembly to the right. As before, the estimator opens switch 150 when he desires to arrest further motion of the cubicle. When the cubicle assembly reaches either limit of travel to the left or right, an element of the assembly engages and opens switch 5 or 5', respectively, to de-energize relay 153 and stop motor 26.

Circuits generally identified at 122 and 123, FIGURE 7, control the energization of marker-moving motor 109, FIGURE 2, or 46, when the marker-moving means of FIGURE 4 is employed. Switch 69 appears at FIGURE 4, upon the console before the estimator. This switch also appears upon FIGURE 7, from which it is seen to have first and second contacts, 69a which are normally closed, and 69b, normally open. Switch 47 appears upon FIGURES 4 and 7 and from the former is seen to be located upon the console, and of the double throw toggle type. When the estimator desires to shift marker 48 to the left, as viewed upon FIGURES 2, 4 and 7, he throws the toggle of switch 47 in a corresponding direction and thereby closes a circuit traced from one side of the line 144, contacts 69a of switch 69, lead 164, cut-out switch 180, switch 47 presently closed to the left, lead 165, solenoid 166a of the relay generally identified at 166, lead 167, and limit switch 168 to the other side of the line 145. On energization of solenoid 166a, the armature 166b of relay 166 is drawn to the right as viewed upon FIGURE 7, and closes its contacts 166c to establish a holding circuit by way of switch contacts 69a, lead 164, switch 180, lead 167a, relay contacts 166c, solenoid 166a, lead 167, etc. At the same time relay contacts 166b are closed to energize motor 46 or 109, as the case may be, and thereby move marker 48 to the left as viewed upon FIGURE 2. The relay includes contacts 166e which are closed when the two solenoids of the relay are de-energized. However, energization of either solenoid 166a or 166f opens contacts 166e and makes it impossible to operate the marker of FIGURE 6.

When the estimator desires to move marker 48 to the right, FIGURES 2, 4 and 7, he correspondingly shifts the toggle of switch 47, thereby completing a circuit which is traced from line 144, switch contacts 69a, lead 164, switch 180, presently closed switch 47, lead 164, solenoid 166f, lead 170, etc. Energization of solenoid 166f draws armature 166b to the left and closes contacts 166g, thus establishing a holding circuit adequately traced from switch 180, lead 172, relay contacts 166g, solenoid 166f, lead 170, etc. The movement of the armature to the left also opens switch 166c, and closes contacts 166h of the circuit of motor 46 or 109, to thereby effect rotation thereof in a direction moving marker 48 to the right. Normally-closed limit switches 168, 171 are opened whenever the marker reaches one or the other of its limits of travel, to thus prevent overrunning. Whenever the estimator wishes to stop movement of the marker in either direction, he opens switch 180.

The marker of FIGURE 6 should not be operated while it is moving with respect to the sheet of glass. Proper operation in this regard is assured by making switch 69 a double-pole, single throw item. As previously explained, this switch has its contacts 69a normally closed, and second contacts 69b, normally open. When it is desired to operate the marker to place an identifiable mark upon the sheet of glass, the estimator pushes the button of switch 69 to open contacts 69a, thus assuring that motor 46 or 109 is de-energized, and closing contacts 69b.

Closure of contacts 69b completes a circuit traced from line 144, contacts 69b, lead 173, presently closed switch 166e, solenoid 174a of relay 174, and lead 175 to main line 145. Energization of solenoid 174a shifts the armature thereof to close contacts 174b and close a circuit to a solenoid valve, not shown, supplied from a source of compressed air identified at 176, FIGURE 4. The valve is of a known type normally vented to atmosphere and actuated in response to energization of its solenoid, to connect source 176 with flexible hose 77, FIGURE 6. When the valve solenoid is de-energized, the piston of the valve reverts under urge of its spring, to a position venting cylinder 65 to atmosphere.

The circuit generally identified at 127, controls the means previously described in connection with FIGURE 5, for lifting a sheet of glass from conveyor rollers 10 and thus temporarily arresting its translation thereon. Reference to FIGURE 4 shows two switch buttons 44, 44' on the console before the estimator. These switches also appear upon FIGURE 7. When the estimator needs more time for inspection of any particular sheet of glass before him, to formulate a plan of cutting thereof, he presses the button of normally-open switch 44, thus closing a circuit traced from one side of the line at 144, switch 44, solenoid 177a of relay 177, lead 178, normally-closed switch 44', and lead 179 to line 145. Energization of solenoid 177a establishes a holding circuit by way of lead 181, holding contacts 177b, lead 178, etc. At the same time the relay closes contacts at 177c to close a circuit to a two-way balanced solenoid valve, not shown. This valve, which is of a well-known type, has its piston spring-urged so that hose 42, FIGURE 5, with which it is connected, is normally in communication with source of compressed air 176, while hose 43 is vented to atmosphere, thus positively holding the parts in the positions shown in full lines upon the figure. When the solenoid of this valve is closed by energization of relay 177, resulting in the closure of contacts 177c, the piston of the aforesaid valve is moved to connect hose 43 with source 176 and to vent hose 42 to atmosphere. Thus, piston 34 is thrust to the left, FIGURE 5, and sheet 11 is elevated free of conveyor rollers 10, as previously explained.

When the estimator desires to again lower the sheet onto rollers 10, he presses the button of normally-closed switch 44' and, in a manner clear from inspection of FIGURE 7, de-energizes relay 177 and opens contacts 177c as a result. In response to the resulting de-energization of the solenoid valve, its spring restores the piston thereof to a position wherein hose 42 is connected to source 176 while hose 43 is vented. By means not shown, such as an adjustably variable vent orifice, the rate of escape of air to atmosphere from hose 43 is slowed, so that sheet 11 is gently lowered onto rollers 10, without danger of breakage.

Electric memory device 103 has been previously mentioned and is shown upon FIGURE 2 as connected by leads 146 with keyboard 102, and by leads 147 with measuring instrument 104. The memory device is used when it is desired to successively affix to the sheet, identically-spaced marks to establish lines, for example, of the cutting of a number of automobile windshields or window panes of equal sizes. It may also be used to effect affixing to the glass of a predetermined sequence of differently-spaced marks, as where sequential sets of panes are to be cut for automobiles, on a production line basis and the panes of each set are of different dimensions.

The memory device employs a punched or magnetic tape and, once set from keyboard 102, will illuminate the proper lamps of instrument 104 and, when marker 48 has been moved to the corresponding position of translation, will stop further movement and effect energization of the marker. It will be understood that arms 112, 113 are connected with repeater 111 through mechanism such as an overrunning clutch so that the arms may be reset by any known reset mechanism, without reversal of the transmitter. When the instrument is under control of the memory device it acts automatically to reset both arms to zero and to initiate a new cycle. When the machine is under direct control of the estimator, he effects resetting by the closure of an appropriate switch on the console before him, and manually initiates the next measuring cycle.

In operation under direct control of the estimator, and with the motor, not shown, in rotation and turning rollers 10, sheets 11a, etc. pass in succession before the operator. These sheets have been previously marked with paint, tape, chalk, or otherwise, to indicate thereon the exact location of defects as identified at 1, and which must be excluded from panels finally cut. As a sheet such as 11b is positioned before him, the estimator notes the marked defective spots or areas on the image on screen 90 and formulates a plan of cutting of the sheet which will result in panels of a size to fill existing orders, while eliminating the defective spots with a minimum loss of saleable glass. By energizing motor 26 he is able to cause frame 20, 20' and cubicle 19 to move at the same linear speed as the sheet so that the image remains motionless upon the screen. Then, by appropriate manipulation of switch 47 he causes the marker to be translated to a position according to his plan, for a vertical score line on the sheet. When the marker reaches this position as determined by the corresponding position of rule 91 over screen 90, he actuates switch 69a to stop motor 46 or 109, as the case may be, and at the same time closing contacts 69b to actuate marker 48 to apply a section of punched tape to the glass. Release of switch 69 again closes contact at 69a and enables him to again translate the marker to a new location for a second mark upon the glass.

In event the estimator needs more time to formulate and carry out his plan of cutting, he closes switch 44 to thereby effect introduction of pressure fluid through conduit 43 to cylinder 32, FIGURE 5. Thereby arms 40 are rotated to engage and elevate the sheet from rollers 10 and to arrest motion thereof. The estimator is, of course, able to effect horizontal translation of the marker whether sheet 11 is being moved on and by rollers 10, or whether it is elevated therefrom and at rest on arms 40. After the desired additional time, the sheet is again lowered onto the rollers by opening switch 44' as previously explained.

When measuring instrument 104 is to be used, the estimator pushes the key or keys of keyboard 100 corresponding to the desired movement of marker 48 from its instantaneous location. He thereby illuminates the corresponding lamp or lamps 105, 106 and initiates rotation of motor 109. Arms 112, 113 begin rotation from their pre-set zero positions, at a rate precisely proportional to rotation of the motor and translation of the marker. Ordinarily one lamp 105 of the outer row and one lamp 106 of the inner row will be energized. The primary windings of relays 108 will then be in cascade so that rotation of arm 112 over its illuminated lamp and the resulting energization of its photoelectric cell will merely close a primary circuit including in series the solenoid of a second relay and the photoelectric cells 114 and 115 of arm 112. Thus, energization of cell 114 as it passes repeatedly over its lamp 106, presently energized, will be without effect until in rotation of arm 113, cell 113′ moves over and is energized by that one of its lamps presently illuminated. Then on the next pass of cell 114 over its illuminated lamp, motor 109 is slowed and stopped, as previously explained. A short interval of time later, as cell 114 passes over the illuminated lamp 106, a relay is energized in the circuit of motor 109 to open the circuit and apply brake 110 so that the motor and marker 48 are brought to a complete stop. The estimator then activates marker 48 to apply a punched section of the tape to the glass at the desired location. Punch 61 of marker 48 may be electromagnetically operated in which event a circuit thereto may be closed automatically over leads 148, FIGURE 2, through a delayed action relay in complex 108 to actuate the marker a short time after it has been brought to a stop.

When memory device 103 is used, the operation is entirely automatic. Such a situation would exist, for example, when the sheet being processed is devoid of imperfections and is to be cut into sections of equal horizontal dimensions. Marker 48 is translated in timed steps through individual distances determined by markings, punch marks or magnetized spots upon the memory tape, stopped, and while being translated with frame 20, 20′ at the same rate as the glass, operated to affix a punched section of tape to the glass. Thereafter brake 110 is automatically released and motor 109 is again energized for another step of movement of the marker as determined by the tape of the memory device. The step-by-step movement of the marker, under the automatic control of device 103 may thus continue indefinitely or until the estimator again takes over control. The steps may be equal or of different distances as determined by prelocated indicia on the tape in device 103.

One of the great advantages of the invention is its extreme versatility. Thus many other modes and sequences of use will occur to those skilled in the art, after a study of the foregoing description. Furthermore, numerous changes, particularly in circuitry, alterations, rearrangement of parts, modifications and substitutions of equivalents will become clear to those skilled in the art, after a study of the disclosure. Consequently the disclosure should be taken in an illustrative rather than a limiting sense. It is our desire and intention to reserve all changes within the scope of the subjoined claims.

Having now fully disclosed the invention, what we claim and desire to secure by Letters Patent is:

1. In an apparatus for handling and translating sheets, roller means operable to engage and support the sheets for translation in succession in a first direction in a common plane of the sheets, lift means movable from a first position free of a sheet on said roller means, to a second position engaging and lifting the sheet free of said roller means, first power driven means connected with said roller means and operable to rotate the same to translate a sheet supported thereby, second power driven means connected with said lift means and operable to move the same between said first and second positions, means mounting said lift means for translation in said first direction independently of a sheet on said roller means, third power means connected with said mounting means and operable to translate said lift means in said first direction, a control station on said mounting means, and controls at said station for selectively and individually effecting operation of said first, second and third power means.

2. In an apparatus for the translation of sheets of glass in and along a substantially vertical common plane of the sheets, a first set of supporting rollers, each rotatable about a respective one of a plurality of horizontally-spaced parellel axes normal to said plane, said first set of rollers conjointly supporting each sheet in succession for translation in a first horizontal direction in said plane, power driven means interconnecting the rollers of said first set for rotation in unison to thereby translate a sheet thereon, a frame mounted for translation in said first direction adjacent said first set of rollers, lifting means carried by said frame and operable from a first position free of a sheet on said rollers, to a second position engaging and lifting the same off said rollers, and power means connected with said lifting means to move the same from said first to said second position.

3. In an apparatus for the translation of sheets of glass in and along a substantially vertical common plane, a plurality of rollers each mounted for rotation about a respective one of a plurality of horizontally spaced axes normal to said plane, power driven means connecting said rollers for rotation in unison to support and translate sheets of glass in a first horizontal direction in and along said plane, a frame, means mounting said frame for translation in said first direction adjacent said rollers, independently thereof, lift means carried by said frame and operable from a first position free of a sheet of glass on said rollers, to a second position engaging and lifting the sheet from said rollers, and power operated means connected with said lift means to move the same between said first and second positions.

4. The apparatus of claim 3, said lift means comprising a plurality of assemblies each positioned at a respective one of a number of points spaced along said first direction, each said assembly comprising an arm mounted at one end on said frame for pivotal movement about an axis parallel with said first direction, support means carried by the distal end of each said arm to engage the lower edge of a sheet on said rollers, said arms in said second position being substantially horizontal with said sheet resting on all said support means and out of contact with said rollers, said power operated means comprising a hydraulic cylinder fixed with said frame, a piston slidable in said cylinder, connections between each said piston and its respective arm to pivot the same about its axis between said first and second positions, and control means operable to simultaneously introduce pressure fluid into all said cylinders.

5. In an apparatus for the inspection, handling and marking of glass sheets to effectuate a plan of cutting thereof, means to support and translate the sheets in succession in a horizontal direction past a viewing station and in the common plane of the sheets, a frame, means mounting said frame for translation in said direction adjacent and independently of said support means, lift means carried by said frame and operable from a first position clear of a sheet on said support means, to a second position engaging and lifting a sheet clear of said support means, a viewing screen carried by said frame, optical means carried by said frame to project onto said screen to a reduced scale, an image of a sheet on said support means, first, second, and third independent power means operable to activate said support means, said lift means and to translate said frame, respectively, and control means on said frame adjacent said screen, for all said power means.

6. The apparatus of claim 5, marker means, means mounting said marker means on said frame for translation with respect thereto in said direction and adjacent a sheet of glass on said support means, fourth power means connected with said marker means to translate the same with respect to said frame, and control means for said fourth power means adjacent said screen.

7. An apparatus for the inspection, handling and marking of a sheet of glass to effectuate a plan of cutting thereof, comprising, means to support and translate the sheet in a direction in its own plane past an inspection station, a frame, means mounting said frame for translation in said direction adjacent and independently of said support means, lift means mounted on said frame and movable from a first position clear of a sheet on said support means, to a second position engaging and lifting the sheet free of said support means, a viewing screen, means to project a reduced-scale image of a sheet on said support means, onto said screen, first and second power means connected with said support means and said lift means, respectively, and control means adjacent said screen to independently control said first and second power means.

8. The apparatus of claim 7, said projecting means including a television camera mounted on said frame in spaced relation with a sheet on said support means, to scan the sheet.

9. In an apparatus for the inspection, handling and marking of a sheet of glass to formulate and effectuate a plan of cutting thereof, support means operable to support and translate a sheet of glass in a fixed direction past a viewing station, a frame, means mounting said frame for independent translation in said direction adjacent a sheet on said support means, lift means carried by said frame and operable from a first position clear of a sheet on said support means, to a second position engaging and lifting the same clear of said support means, a marker, means carried by said frame and supporting said marker for translation in said direction along and contiguous to a sheet on said support means, power means connected with said marker to so translate the same, and means operable to energize said marker to make a mark at a selected point on a sheet on said support means.

10. The apparatus of claim 9, a viewing screen, means operable to project onto said screen to a reduced scale, an image of a sheet on said support means, a ruler mounted for translation in a direction normal to its length, parallel with and over said screen, and telemetric connections between said marker and said ruler translating them in unison to said reduced scale, in their respective directions of translation.

11. The apparatus of claim 10, said screen being mounted on said frame, independently operable power means to actuate said support means, translate said frame, operate said lift means and translate said marker on and with respect to said frame adjacent and screen, and control means on said frame adjacent said screen to effect the operation of all said power means.

12. The apparatus of claim 9, said marker comprising an apertured punch plate carried by said frame contiguous to and parallel with a plate on said support means, means guiding a strip of adhesive marking tape across said plate and the aperture therein, a punch reciprocably mounted on said frame for passage through the aperture in said punch plate, power means connected with said punch to reciprocate the same in punching stroke, and means responsive to reciprocation of said punch to operate said strip-guiding means and thereby move the tape with respect to said punch plate.

13. An apparatus for the inspection, handling and marking of a sheet of glass in preparation for cutting the same into sections, comprising, power driven support means for supporting and translating the sheet in a horizontal direction in the plane thereof, a frame, means mounting said frame for translation in said direction adjacent and independently of said support means, a marker, means mounting said marker on said frame for translation relatively thereto in said direction and contiguous to a sheet on said support means, a screen, optical means operable to project onto said screen, to a reduced scale, an image of a sheet on said support means, a ruler translatable over said screen in a direction normal to its length and parallel with said screen, a measuring instrument including a plurality of spaced electric lamps, a member movable over said lamps in sequence, a photoelectric cell carried by said member for energization by any one of said lamps when energized, switch means adjacent said screen to illuminate any selected one of said lamps, telemetric means operating said marker, ruler and member in synchronism, a motor driving said marker and telemetric means in unison, and circuit means responsive to energization of said photoelectric cell by an energized one of said lamps, to de-energize said motor.

14. The apparatus of claim 13, said lamps being arranged in a circular row and equiangularly spaced, said member being an arm pivoted at the center of said row of lamps and carrying said photoelectric cell at its distal end for movement in succession over said lamps, said telemetric means comprising a first transmitter motor connected with said first-named motor for operation in synchronism therewith, a first repeater motor connected with said ruler to translate the same, a second transmitter motor connected with said arm to rotate the same, and electrical connections between said transmitter motor and said first and second repeater motors.

15. The apparatus of claim 13, said measuring instrument comprising outer and inner rows of concentric spaced lamps, first and second arms each pivoted at the common center of said rows of lamps, a first photoelectric cell mounted on said first arm for movement in succession over the lamps of said outer row, a second photoelectric cell mounted on said second arm for movement in succession over the lamps of said inner row, said arms being connected to rotate said inner arm a full rotation while said outer arm is moving from a first position over one lamp, to a second position over the next adjacent lamp, said switch means being operable to energize a selected pair of lamps, one in said outer row and one in said inner row, and relay means in circuit with said photoelectric cells and energized only in response to the sequential energization of both said photoelectric cells, and a circuit for energizing said motor and including a circuit closer controlled by said relay means.

16. The apparatus of claim 13, said screen, optical means, measuring instrument and switch means being mounted on said frame, in adjacent relation, for translation as a unit therewith.

17. In an apparatus for the inspection, handling and marking of a sheet of glass in preparation for cutting the same into sections, power drive support means for supporting and translating the sheet in a horizontal direction in the plane thereof, a frame, means mounting said frame for movement in said direction independently of said support means, a marker, means mounting said marker on said frame for translation in said direction relatively to said frame and contiguous to a sheet on said support means, a motor carried by said frame and connected with said marker to so translate the same, a measuring instrument including a plurality of spaced electric lamps, a member movable over said lamps in sequence, a photoelectric cell carried by said member for energization by a selected one of said lamps when illuminated, circuit closing means to energize selected one of said lamps, a repeater connected with said member to move the same, a transmitter connected with said motor to be driven thereby, telemetric connections between said transmitter and said repeater, and circuit means for energizing said motor and including switch means opened by energization of said photoelectric cell.

18. The apparatus of claim 17, and a memory device electrically connected with said measuring instrument and operable to control the lamp thereof to be energized.

19. The apparatus of claim 18, said memory device effecting sequential energization of different ones of said lamps.

20. The method of marking a sheet of material to identify thereon the location of cutting lines, comprising, translating the sheet in a direction in its own plane, translating at the same rate in said direction an optical screen having thereon an image of the sheet, moving a marker over and relatively to the sheet while so moving, synchronously and to a reduced scale, moving a ruler over the screen, and operating the marker when it has arrived at a location for a cutting line on and over the sheet, as determined by the corresponding position of the ruler over and with respect to the image of the sheet on the screen.

21. The method of marking a sheet of glass to identify thereon the location of lines along which the sheet is to be severed into sections, comprising, translating the sheet horizontally in its own plane, translating at the same rate and in said direction, an optical screen while projecting onto the screen a reduced-scale image of the sheet, moving in synchronism to said reduced scale a marker and a ruler over the sheet and screen, respectively, and actuating the marker to place an identifying symbol on the glass when the marker is at a desired position over and with respect to the sheet as determined by the corresponding position of the ruler over and with respect to the image of the sheet upon the screen.

22. The method of claim 21, and temporarily arresting translation of the sheet by supporting the same functionally integral with the screen.

23. The method of marking sheets of glass moving in succession past a viewing station in a direction in the common plane of the sheets, comprising, projecting upon a viewing screen a reduced-scale image of a sheet passing said station, moving a marker in said direction over and adjacent the sheet passing said station, moving an index over the screen in synchronism with the marker, to said reduced scale, and operating the marker to mark the position on the sheet of a cutting line along which the same is to be severed, by inspection of the image of the sheet on the screen and the position of the index with respect thereto.

24. Apparatus for determining and establishing thereon a severing plan for a sheet of glass, comprising first means for supporting the sheet at a predetermined location, a viewing screen located remote from said first means, second means projecting onto said screen, to a reduced scale, an image of an area of a sheet of glass supported on said first means, rule means mounted for translation in a first direction over and adjacent said screen, a marker frame mounted for translation in a corresponding direction over and adjacent said area of the sheet, and means interconnecting said rule means and said marker frame to translate said rule means in said first direction and at said reduced scale by and in response to translation of said marker frame in said direction.

25. In an apparatus for determining and establishing thereon a plan for severing a plane sheet of glass, first means supporting said sheet at a predetermined location, a viewing screen, optical means projecting onto said screen, to a reduced scale, an image of an area of the sheet at said location, a rule mounted for translation over and adjacent said screen in a first direction normal to its length and parallel to said screen, an elongated marker frame mounted for translation over and adjacent said area in a second direction normal to its length and parallel to the sheet, and telemetric means connecting said rule for synchronous translation by and in response to translation of said marker frame, and to said reduced scale.

26. The apparatus of claim 25, said last-named means comprising a motor connected to said marker frame and operable to translate the same in said second direction, a transmitter connected for synchronous operation by said motor, a first repeater connected with said rule to translate the same in said first direction, and electric telemetric connections between said transmitter and said first repeater.

27. The apparatus of claim 26, a measuring device including (1) means under control of the operator at said screen and settable for a desired dimension of translation of said marker in said second direction, (2) a second repeater and (3) follow-up means driven by and in synchronism with said second repeater, a telemetric connection between said transmitter and in said second repeater, and means controlled by coincidence between said settable means and said follow-up means to de-energize said motor.

28. The apparatus of claim 25, said optical means comprising an optical chain of lenses of reflectors, said first means screen and optical means being constructed and arranged for simultaneous translation parallel with the horizontal in the plane of the glass sheet.

29. The apparatus of claim 25, said optical means comprising a television camera scanning the sheet and a remote receiver including said viewing screen.

30. An apparatus for determining and recording thereon, lines along which a plane sheet of material is to be severed, comprising means supporting said sheet, a viewing screen remote from said means, optical means projecting onto said screen an image of said sheet reduced in scale, a rule mounted for translation over and adjacent said screen parallel thereto, a marker frame mounted for translation over a sheet mounted on said supporting means, power driven telemetric means connecting said rule for translation, to said reduced scale, by and in response to translation of said marker frame.

31. The apparatus of claim 30, said marker frame being elongated and extending transversely over and across the sheet for translation in a direction normal to its length and parallel with the longitudinal dimension of the sheet, a marker mounted for translation on and along said marker frame, transversely of the sheet, and a power driven means carried by said marker frame and connected with said marker, to translate the same on and along said first marker.

References Cited by the Examiner
UNITED STATES PATENTS

| | | | |
|---|---|---|---|
| 1,931,628 | 10/1933 | Reis | 198—127 X |
| 2,452,364 | 10/1948 | Fowler et al. | 88—14 |
| 2,744,131 | 12/1956 | Crane. | |
| 2,851,643 | 9/1958 | Limberger. | |

NORTON ANSHER, *Primary Examiner.*

V. A. SMITH, R. A. WINTERCORN,
*Assistant Examiners.*